United States Patent [19]
Iisuka

[11] 3,740,152
[45] June 19, 1973

[54] DEVICE FOR DETECTING THE BOUNDARY BETWEEN DIFFERENT BRIGHTNESS REGIONS OF AN OBJECT

[75] Inventor: Kiyoshi Iisuka, Kawasaki-shi, Japan
[73] Assignee: Nippon Kogaku K.K., Tokyo, Japan
[22] Filed: June 23, 1971
[21] Appl. No.: 155,839

[52] U.S. Cl.......... 356/156, 250/202, 250/219 DR, 356/163
[51] Int. Cl..................... G01b 11/00, G05b 1/00
[58] Field of Search.......................... 356/163, 156; 250/219 DR, 219 WD, 202

[56] References Cited
UNITED STATES PATENTS
2,489,305  11/1949  McLennan.......................... 250/202
3,443,108  5/1969   Burmeister.................. 250/219 DR
3,553,456  1/1971   Parks et al.......................... 250/202

Primary Examiner—Ronald L. Wibert
Assistant Examiner—V. P. McGraw
Attorney—Raymond J. McElhannon, Lorimer P. Brooks, Joseph M. Fitzpatrick et al.

[57] ABSTRACT

A device for automatically determining the position of a boundary between light and dark regions of an object such as an IC mask pattern or the like, the device including an optical system for forming a point or line symmetrical double image, a light beam modulator means for providing a position signal from an image formed through said optical system, a photoelectric converter means for converting a light signal modulated by the light beam modulator means into an electrical signal, and a phase detector means for converting the electrical signal from the photoelectric converter into a DC signal, whereby the position of the boundary may be determined in a highly accurate and stable manner irrespective of any relatively great or small brightness and difference between the light and dark regions of the object, and without any adverse effect resulting from such variable factors as the variation in brightness of the image, the aging of the detector element and operator errors.

9 Claims, 14 Drawing Figures

Patented June 19, 1973 3,740,152
2 Sheets-Sheet 1
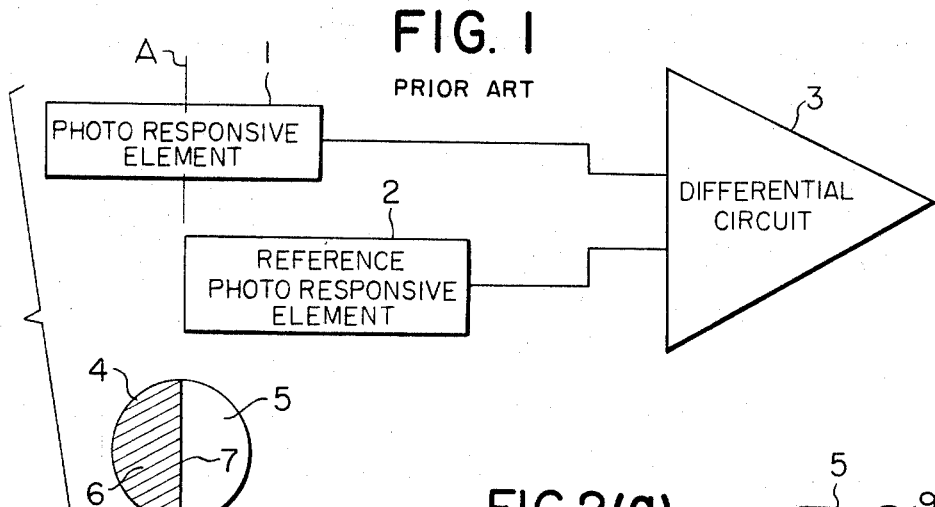
FIG. 1
PRIOR ART
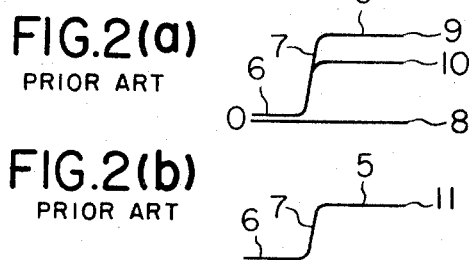
FIG.2(a)
PRIOR ART
FIG.2(b)
PRIOR ART
FIG. 3
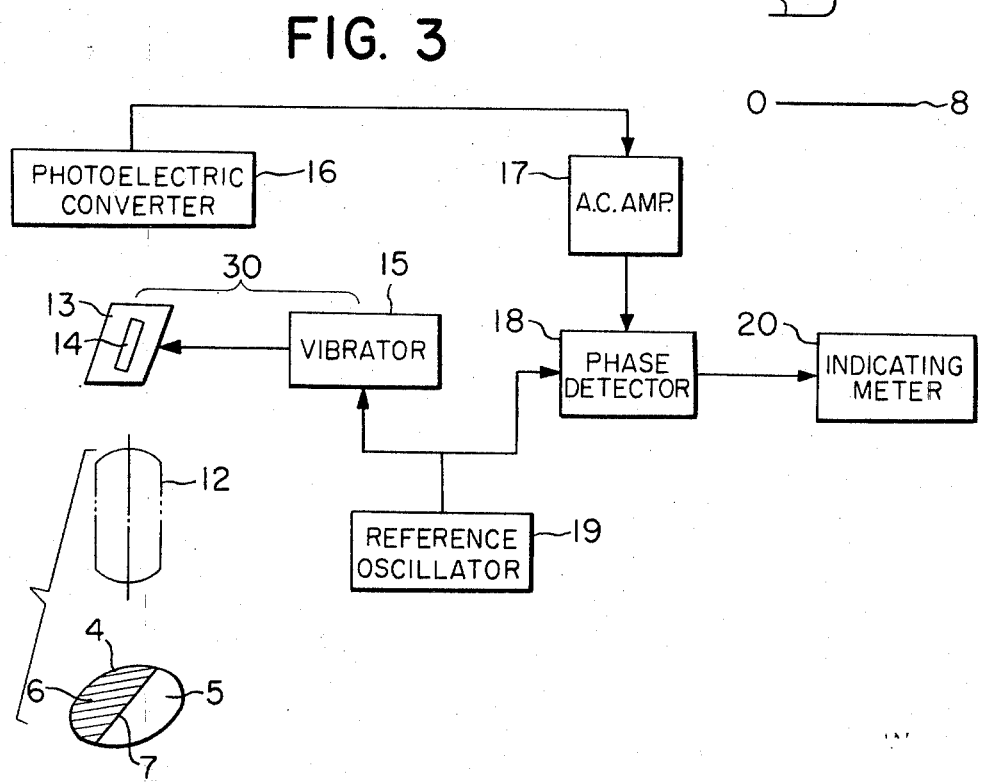

DEVICE FOR DETECTING THE BOUNDARY BETWEEN DIFFERENT BRIGHTNESS REGIONS OF AN OBJECT

BACKGROUND OF THE INVENTION

1. Field of the Invention

This invention relates to a device for determining the position of a boundary of a brightness such as the boundary between regions of different brightnesses or the outline of a projected image provided by an outline projector or the like.

2. Description of the Prior Art

A device for automatically measuring the outline of a projected image provided by a projector or the like is known. Such a known device includes a measuring photoresponsive element and a reference photoresponsive element which is approximately half the size of the measuring element. A differential circuit is connected with the two photoresponsive elements for detecting the output difference between these elements. An optical image comprising a light region and a dark region contiguous to each other along a boundary is caused to approach the photoresponsive elements. When the boundary in the optical image reaches a certain position with respect to the measuring photoresponsive element, the outputs of the two elements become equal to each other so that the differential circuit provides a zero output. Such a position is invariable even if the brightness of the light region in the optical image is reduced to a certain extent. However, if the brightness of the dark region is higher than a certain level, the measuring element will always receive a greater quantity of light than the reference element and this in turn will result in a variation in the output of the differential circuit, which makes it impossible to determine the position of a boundary by the output of such circuit.

SUMMARY OF THE INVENTION

The present invention intends to overcome the foregoing drawback existing in the prior art and provide a device for automatically determining the position of a boundary between light and dark regions of an object with high accuracy and high stability irrespective of any relatively great or small difference in brightness between the light and dark regions, and without any adverse effect resulting from the variation in the brightness of the image and/or from the aging of detector element and without any error occurring from individual measurer to measurer.

The device according to the present invention comprises an optical system for forming a point or line symmetrical double image, a light beam modulator means for providing a position signal from an image formed through the optical system, a photoelectric converter means for converting a light signal modulated by the light beam modulator means into an electrical signal, and a phase detector means for converting the electrical signal from the photoelectric converter means into a DC signal.

An embodiment of the present invention will be described hereunder in greater detail in conjunction with the accompanying drawings.

BRIEF DESCRIPTION OF THE DRAWINGS

FIG. 1 is a block diagram of the boundary determining device according to the prior art.

FIGS. 2a and 2b show curves representing quantities of distributed light in the device of FIG. 1 for illustrating the operation thereof.

FIG. 3 is a block diagram of an example of the device according to the present invention. FIGS. 4a to 4c, 5a to 5c and 6a to 6c are illustrations of the operation of the device of FIG. 3, wherein FIG. 4 illustrates the relationship between an image and a scanning slit, FIG. 5 illustrates the variations in quantity of distributed light resulting from the scanning, and FIG. 6 illustrates the waveforms of electrical signals provided by a photoelectric converter.

DESCRIPTION OF THE PREFERRED EMBODIMENTS

Figure 4A:
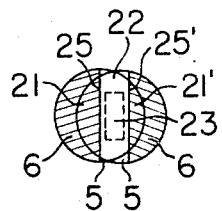

To compare the present invention with the prior art, reference is first had to FIGS. 1 and 2 which relate to the conventional boundary determining device. As shown in FIG. 1, the device of the prior art includes a measuring photoresponsive element 1 and a reference photoresponsive element 2. The former element is approximately twice as large as the latter. The two photoresponsive elements 1 and 2 are connected with a differential circuit 3 which detects the output difference between these elements. An optical image 4 to be measured comprises a light region 5 and a dark region 6 which are contiguous to each other along a boundary 7. The quantity of light distributed in the optical image 4, wherein the light in the dark region is almost equal to zero, is shown by a curve 9 in FIG. 2(a), where line 8 designates zero quantity of light. The optical image is moved along the photoresponsive elements from left to right as viewed in FIG. 1. When the image reaches a position where its boundary 7 is aligned with the center line of the measuring photoresponsive element 1 as indicated by a reference line A, the output of the measuring photoresponsive element 1 becomes equal to the output of the reference photoresponsive element 2, because the light from region 5 impinges only on the reference element 2 and on the right-hand half of element 1, so that the output of the differential circuit 3 becomes zero. In this position, the right-hand half of the measuring element 1 is equal in dimensions to the reference element 2, and therefore such output is invariable even if the brightness of the light region 5 is reduced to provide a quantity of distributed light as indicated by a curve 10 in FIG. 2(a). However, when the difference in brightness between the light region 5 and the dark region 6 is reduced, as for example due to a relatively large light quantity in region 6 as indicated by a curve 11 in FIG. 2(b), the measuring photoresponsive element 1 will always receive a greater quantity of light than the reference photoresponsive element 2 due to the continuous reception of light by the left-hand half thereof. In such case, therefore, it becomes impossible to determine the boundary between the light and dark regions of the image by the use of the output of the differential circuit 3.

Referring now to FIG. 3, there is shown an embodiment of the present invention. An object to be measured is designated by numeral 4 and comprises a light region 5 and a dark region 6 which are contiguous to each other along a boundary 7. Numeral 12 designates a known optical system for forming a point or line symmetrical double image. A scanning slit plate 13 is disposed adjacent to the optical system 12 and formed with a slit 14, which extends perpendicularly to the scanning direction of the slit plate and is parallel to the boundary 7 in the object to be measured. A vibrator 15 is provided for vibrating the slit plate 13. The slit plate 13 with the slit 14 and the vibrator 15 together constitute a light beam modulating means 30. A photoelectric converter 16 for detecting a light beam passed through the slit 14 is electrically connected with an AC amplifier 17 for amplifying a signal from the photoelectric converter 16. The amplifier 17 in turn is connected with a phase detector 18. A reference oscillator 19 is connected, on the one hand, with the vibrator 15 and on the other hand, with the phase detector 18, which in turn is connected with an indicating meter 20.

With the described arrangement, the object 4 such as an IC mask pattern or an image projected from a projector onto a screen is focused in the scanning slit 14 through the optical system 12 for forming a point or line symmetrical double image. The scanning slit 14 is vibrated by the vibrator 15 in synchronism with a signal of a predetermined frequency from the reference oscillator 19 so as to scan the image formed through the optical system 12. The reference oscillator 19 may be omitted when a commercially available predetermined frequency is used. A light beam passed through the scanning slit 14 impinges on the photoelectric converter 16, which converts such light beam into an electrical signal. The electrical signal thus provided and the positional relationship between the object 4 and the measuring device will now be described by reference to FIGS. 4 to 6.

Figure 5A:
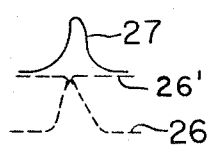
Figure 4B:
Figure 5B:
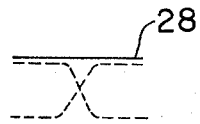
Figure 4C:
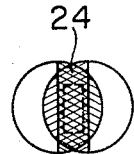
Figure 5C:
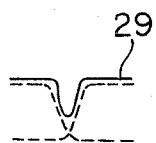

FIG. 4 shows the relationship between the image of the object 4 formed through the optical system 12 and the center position of the scanning amplitude of the scanning slit 14. FIG. 5 illustrates the variation in quantity of distributed light resulting from the scanning of the light beam passed through the scanning slit 14. FIG. 6 illustrates the waveforms of the electrical signals provided by the photoelectric converter 16. In FIG. 4, (a) refers to the case where the boundary 7 in the object 4 is slightly deviated in one direction from the optic axis of the optical system 12, (b) refers to the case where the boundary 7 is aligned with the optic axis, and (c) refers to the case where the boundary 7 is slightly deviated in the other direction from the optic axis. As seen in FIG. 4(a), the characteristic of the optical system 12 results in the formation of image portions 21 and 21' where the images of the light and dark regions 5 and 6 of the object 4 overlap each other, image portion 22 where the image of the light region 5 appears in the form of a double image, and images 25 and 25' representing the boundary 7 in the object 4. The area designated by numeral 23 shows the case where the scanning slit 14 is positioned at the center of the scanning amplitude. In FIG. 4 (c), numeral 24 designates an image portion where the image of the dark region 6 of the object is caused to appear in the form of a double image by the optical system 12. Sequentially varied relative position of the object and the device causes the image of the object 4 formed through the optical system 12 to be varied in the order of FIG. 4(a), (b) and (c) or vice versa. The variations in the quantity of light passed through the scanning slit 14 during one scanning cycle of the slit 14 in the cases of FIG. 4(a), (b) and (c) are indicated by curves 27, 28 and 29 in FIG. 5(a), (b) and (c), respectively. In FIG. 5(a), lines 26 and 26' indicate the variations in the quantity of light provided when it is assumed that scanning is effected only on one of two symmetrical image components of a point or line symmetrical image. Actually, two images are superposed one upon the other, and therefore the actual variation in the quantity of light is represented by the curve 27 which is the sum of the curves 26 and 26'. This is also the case with (b) and (c). In the case of (b), it is seen that no variation occurs in the quantity of light passed through the scanning slit 14.

Figure 6A:
Figure 6B:
Figure 6C:

As clearly seen in FIG. 5, the photoelectric converter 16 provides signals having the waveforms as shown in FIGS. 6(a), (b) and (c). FIG. 6(a), (b) and (c) each shown only the variable component of these signals. The waveforms shown in FIGS. 6(a), (b) and (c) indicate that the variation in the signal from the photoelectric converter 16 becomes zero when the boundary 7 in the object 4 is completely aligned with the optic axis of the optical system 12 and that when the boundary 7 is deviated from the optic axis to left or right as viewed in FIG. 3, there is provided an AC signal whose phase has been reversed in accordance with the direction of such deviation. The signal from the photoelectric converter 16 is amplified by the AC amplifier 17 and then applied to the phase detector 18. If the AC amplifier 17 is a band-pass amplifier whose center frequency is equal to the oscillation frequency of the reference oscillator 19, it may remove any noise component to thereby enable detection to be effected with higher sensitivity and higher stability. As is well known, the phase detector may be a phase sensitive rectifier and may provide a signal of positive or negative polarity in accordance with the phase of the input signal with respect to the reference signal, and it provides a signal whose magnitude is proportionate to the amplitude of the input signal. The output of the phase detector becomes zero for zero input and for even harmonics of the reference signal. Thus, when the boundary 7 in the object 4 is aligned with the optic axis of the optical system 12, the output of the phase detector 18 becomes zero so that the position of the boundary 7 can be determined. If the variation in the brightness of the object in the vicinity of the boundary 7 is irregular, the line 28 in FIG. 5 will not be rectilinear. Therefore, the variation in the signal from the photoelectric converter 16 does not become zero as shown in FIG. 6(b) but provides an AC signal. However, such AC signal is even harmonics of the reference signal as will be readily appreciated from the fact that there is provided a point symmetrical image, and therefore the output signal of the phase detector 18 becomes zero as in the case described above, whereby no erroneous detection occurs. The output of the phase detector 18 is a DC signal which enables the position of the boundary 7 to be determined by the pointer of the indicating meter 19.

Provision of an additional circuit which uses the output signal of the phase detector 18 to generate a pulse at a point where the output passes zero would obviously make the device versatile for various usages including automatic measurement.

Figure 7:
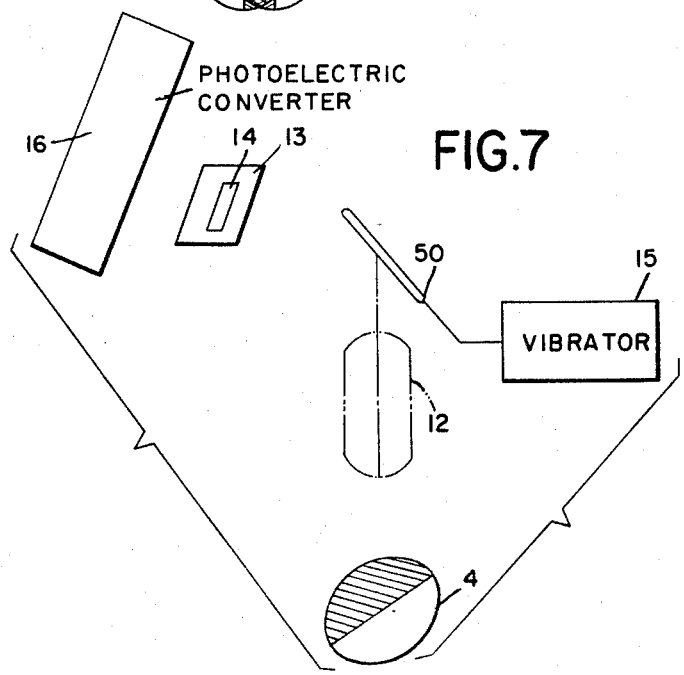

Although the present invention has been shown and described as embodied in a light beam modulating device for obtaining positional information by causing the scanning slit to vibrate while causing it to scan a light beam passed therethrough, it will be apparent to those skilled in the art that the slit may be stationary while the light beam may be vibrated by a vibrating mirror. For example, as illustrated in FIG. 7, the slit plate 13 may be disposed in a fixed relation with respect to the photoelectric converter 16 and the lens 12 so that light from the image 4 which passes through the lens 12 is reflected by a movable mirror 50 through the slit 14 to the converter 16. Thus, in the modification of the embodiment of the invention illustrated in FIG. 7, the vibrator 15 is arranged to vibrate the mirror 50, thereby producing the required scanning action.

Thus, according to the present invention, the position of the boundary between the light and dark regions which must be determined for the measurement of IC patterns or the like can be determined with high accuracy but without any adverse effect arising from errors of the individual measurers. Moreover, even an object having a low contrast of light and shade can be measured stably irrespective of such variable factors as the brightness of the illuminating light source and the sensitivity of the detecting photoelectric converter.

I claim:

1. A device for determining the position of a boundary between different brightness regions of an object, comprising:
   an optical system for forming a symmetrical double image of an object;
   light beam modulator means for producing a light signal from said image formed through said optical system;
   photoelectric converter means for converting said light signal modulated by said light beam modulator means into an electrical signal; and
   phase detector means coupled to said modulator means and said converter means for converting said electrical signal from said photoelectric converter means into a DC signal.

2. A device as defined in claim 1, wherein said light beam modulator means comprises a scanning slit plate formed with a scanning slit for passing therethrough a light beam from said object, and a vibrator for vibrating said slit plate.

3. A device as defined in claim 2, wherein said scanning slit plate moves reciprocally in one direction and said scanning slit extends perpendicularly to the scanning direction of said slit plate and parallel to the boundary of said object.

4. A device as defined in claim 2, wherein said modulator means further comprises a reference oscillator, and wherein said scanning slit plate is vibrated by said vibrator in synchronism with a signal of a predetermined frequency applied to said vibrator by said reference oscillator.

5. A device as defined in claim 2, wherein said modulator means further comprises means for applying an electrical signal of predetermined frequency to said vibrator, and wherein said scanning slit plate is vibrated by said vibrator in synchronism with said predetermined frequency.

6. A device as defined in claim 1, wherein said light beam modulator means comprises a scanning slit plate formed with a scanning slit and a vibrating mirror for vibrating a light beam passed through said scanning slit.

7. A device as defined in claim 1, further comprising an AC amplifier for amplifying the electrical signal from said photoelectric converter means, and an indicating meter for indicating the DC signal from said phase detector means representing the position of said boundary.

8. A device for determining the position of a boundary between different brightness regions of an object, comprising:
   an optical system for forming a symmetrical double image of said object;
   means for generating a signal of a predetermined frequency;
   scanning means connected to said signal generating means for scanning said image formed through said optical system in synchronism with said signal from said signal generating means to thereby provide a positional signal representing the position of the boundary;
   photoelectric converter means for converting said positional signal into an electric signal; and
   phase detector means coupled to said photoelectric converter means and to said signal generating means for using said signal from said signal generating means as a reference signal to convert said electrical signal from said photoelectric converter means into a D.C. signal representing the position of said boundary.

9. A device for determining the relative positions of a reference line and a boundary between different brightness regions of an object, comprising:
   an optical system for forming a symmetrical double image of an object;
   light beam position modulator means for producing a light signal from said image, wherein said light signal is position modulated with respect to said reference line;
   photoelectric converter means for converting said light signal into an electrical signal; and
   phase detector means coupled to said modulator means and said converter means for providing an output signal which is proportional to the position of said boundary relative to said reference line.

* * * * *

UNITED STATES PATENT OFFICE
CERTIFICATE OF CORRECTION

Patent No. 3,470,152 September 30, 1969

Ottmar Zipp et al.

It is certified that error appears in the above identified patent and that said Letters Patent are hereby corrected as shown below:

Column 8, second formula, cancel "-Br".

Signed and sealed this 26th day of May 1970.

(SEAL)
Attest:

Edward M. Fletcher, Jr.
Attesting Officer

WILLIAM E. SCHUYLER, JR.
Commissioner of Patents 91.297

UNITED STATES PATENT OFFICE
CERTIFICATE OF CORRECTION

Patent No. 3,740,152　　　　　　　　Dated June 19, 1973

Inventor(s) KIYOSHI IIZUKA

It is certified that error appears in the above-identified patent and that said Letters Patent are hereby corrected as shown below:

Front Page, at [75], change "IISUKA" to -- IIZUKA --.

Column 2, line 12, add the following paragraph "Fig. 7 is a block diagram of a modification of the device according to the present invention. --

Column 6, line 27, change "electric signal" to -- electrical signal --.

Signed and sealed this 27th day of November 1973.

(SEAL)
Attest:

EDWARD M. FLETCHER, JR.　　　　　RENE D. TEGTMEYER
Attesting Officer　　　　　　　　　Acting Commissioner of Patents